Patented Feb. 5, 1929.

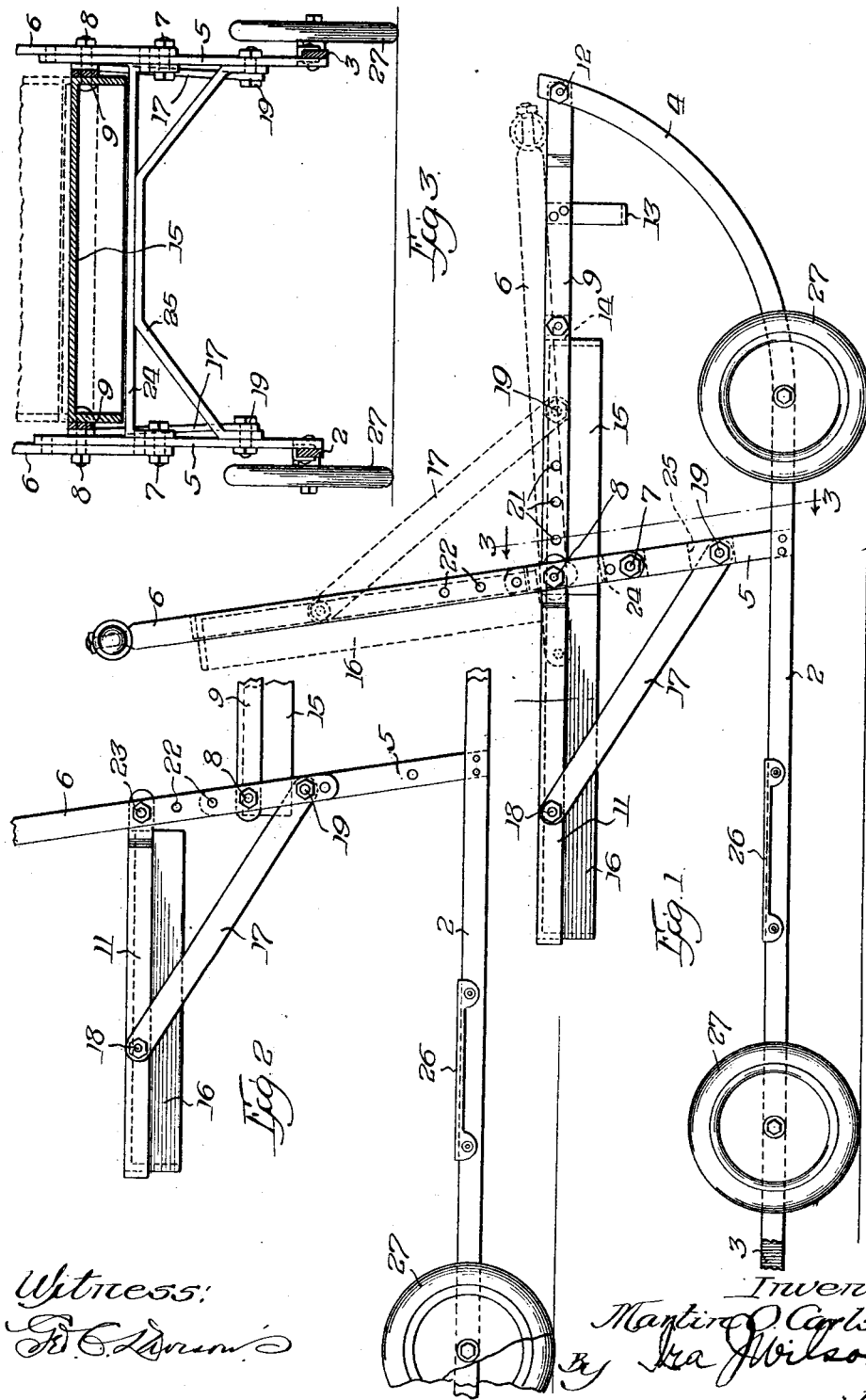

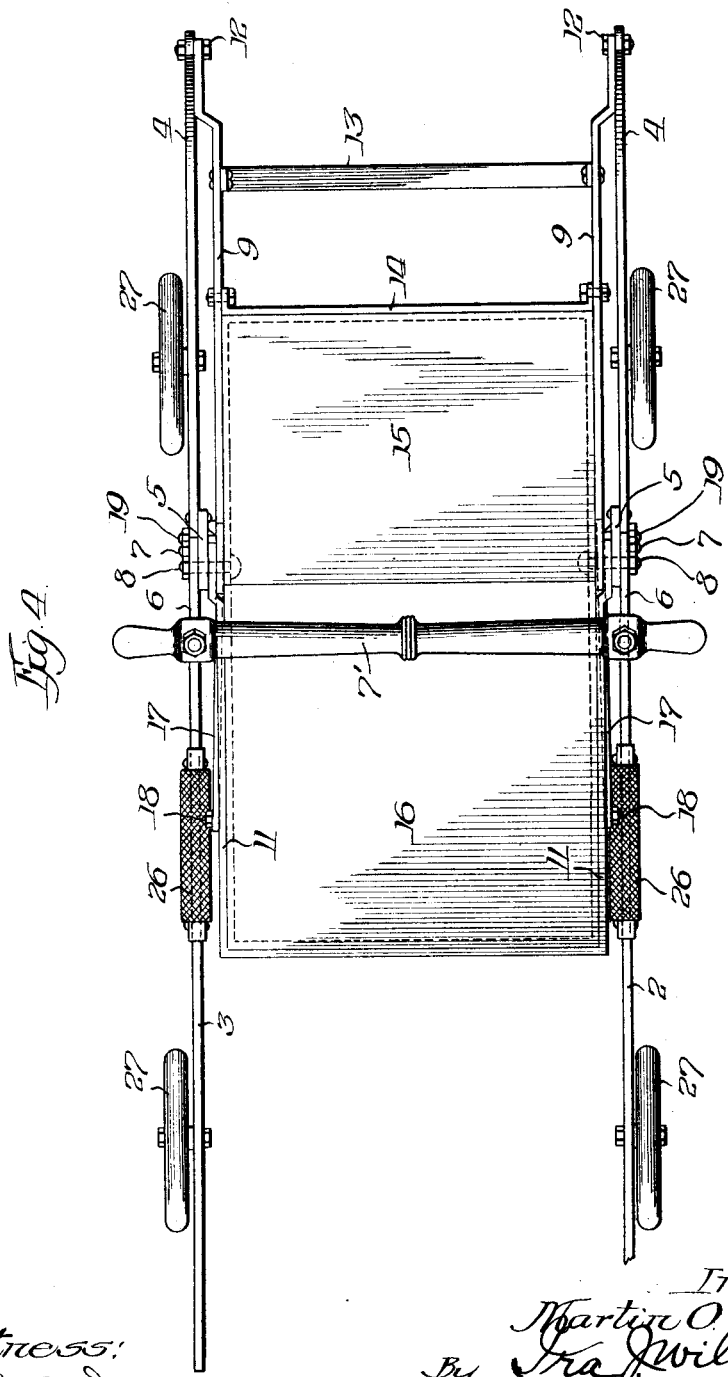

1,700,997

UNITED STATES PATENT OFFICE.

MARTIN O. CARLSON, OF CHICAGO, ILLINOIS.

PUSH SLED.

Application filed April 8, 1927. Serial No. 181,978.

This invention relates to light vehicles for children and more particularly to a combination sled and wheeled vehicle adapted to be used on snow and ice in winter and as a wheeled coaster or glider when snow and ice are gone from the ground. The invention is an improvement upon that disclosed in my Patent No. 1,458,392, dated June 12, 1923, and on the vehicle disclosed in my application Serial No. 754,931, filed December 10, 1924.

The vehicles illustrated and described in the aforesaid patent and application are adapted for operation by a rider who stands upright on one of the runners on one foot and pushes the vehicle with his other foot, but no provision is made for the operator to seat himself after starting the vehicle in motion or for the rider of the front seat to rest his back while riding.

One of the primary objects of the present invention is to provide a seat for the operator adapted to support the operator after he has started the vehicle in motion and a platform upon which the operator may rest one knee and leg while utilizing the other for locomotion purposes.

Another object is to provide a seat for the purpose just set forth and for the further purpose of serving as a back rest for the rider of the front seat if the operator does not care to use it for himself.

A further object is to provide a novel combination front and rear seat construction adapted to seat two or more persons, as when the steering handles are upright and one or more persons lying prone when the seats are contiguous and the steering handles are removed or lowered, and to provide a seat construction which may be inverted in whole or in part and used as a wagon or the like for carrying parcels or any other purpose.

Still further objects including the details of construction, arrangement and operation of the parts and vehicle as a whole will be or should become appreciated after reading the following description and claims, and after viewing the drawings in which:

Fig. 1 is a side elevational view of a preferred form of the invention showing in full and dotted lines two positions of the rear seat and steering handles, Fig. 2 is a fragmentary side elevational view showing the rear seat placed in a different position from either of the positions illustrated in Fig. 1, Fig. 3 is a fragmentary elevational view taken on the line 3—3 of Fig. 1, and Fig. 4 is a top plan view of the vehicle illustrated in Fig. 1.

The vehicle comprises two longitudinally extending and substantially parallel runners or supporting members 2 and 3 preferably curved upwardly at their forward ends, as shown at 4. These runners or members 2 and 3 are preferably made of steel and to them adjacent their forward ends a pair of steel strips 5 one on each runner are riveted or otherwise secured in a slightly rearwardly inclined direction. These strips 5 are each drilled at corresponding distances above the runners 2 and 3 for the reception of pivot bolts for the several structures to be attached to them. The steering handles 6 are connected at their upper ends by a transverse brace and handle member 7 and ordinarily connected by bolts 7' and 8 to the strips or risers 5 in order that they may be substantially rigid therewith when in their full line positions shown in Figs. 1 and 4. When it is desired to lay the handles flat into the dotted line position illustrated in Fig. 1 the bolts 7 are removed whereupon the handles will pivot about the bolts 8 in their swinging movements.

The pivot bolts 8 also serve to connect and pivotally support fore and rear seat frame members 9 and 11 respectively, as will be noted. The fore seat frame members 9 are connected at their forward ends at 12 to the runners 2 and 3 and are joined intermediate their ends by two transverse braces 13 and 14, the brace 13 also serving as a foot rest for a passenger seated upon the forward seat 15 which is secured in any suitable manner to the base 14 and the frame members 9.

The rear seat frame members 11 are preferably pivotally mounted on the bolts 8 between the risers 5 and the fore seat frame members 9 and therefore fall interior of the handle members 6. The rear seat 16 may be swung from the position illustrated in full line to the position illustrated in dotted lines in Fig. 1 and thereby provide a back rest for the occupant of or passenger on the fore seat 15. In order that the rear seat 16 may be supported in its full or dotted line positions illustrated in Fig. 1 or in positions intermediate the same for the purpose of providing an inclined back rest to suit the comfort of the passenger on the fore seat a brace member 17 on each side of the vehicle is pivotally connected to the frame members 11 by bolts 18 at one end and removably bolted to the risers 5 by bolts 19 at their other ends. The fore seat frame members and the sides of the fore seat may be drilled at suitable intervals, as shown at 21, for connection of the lower ends of the braces 17 thereto by means of the bolts 19 so that when the rear seat 16 is to be used as a back rest the location of the hole in which the bolt 19 is located determines its inclination with respect to the fore seat 15.

It is sometimes desirable that the rear seat be elevated sufficiently above the ground that the operator of the vehicle may rest one knee thereon while propelling the vehicle with the other foot. To this end the handles 6 are drilled at suitable intervals 22 for bolts 23 adapted to secure the rear seat frame members 11 to the handles 6 at different heights while the risers 5 and handles 6 are likewise drilled with registering holes for corresponding positions of the braces 17. This arrangement is illustrated more particularly in Fig. 2.

Sometimes also it may be desired to utilize the vehicle as a wagon and for this purpose either the fore or rear seat, but preferably both, may be constructed in the form of a box, the open side of the box normally projecting downwardly. In the form of the invention illustrated each seat is made in the form of half of an open box, the two parts when disposed in contiguous relation providing a single receptacle. When the vehicle is to be used as a wagon the handles 6 may be laid flat in the dotted line position illustrated in Fig. 1 or entirely removed and the seats are removed and replaced in upside down positions, that is, with the normal seating surfaces directed downward. Packages and other articles may then be disposed within the wagon thus provided and transported about from place to place, as desired.

In order to provide a substantially rigid construction I prefer to brace the runners intermediate their ends by transverse braces designated 24 and 25 which ordinarily will be directly secured to the risers 5 and, in order that the vehicle operator may ride in standing position, as disclosed in my aforesaid patent and copending application, the runners to the rear of the handles are provided with foot rests or plates 26. Demountable wheels 27 are pivotally mounted on the runners fore and aft of the handles for use on streets and pavements after the snow and ice have gone from the ground, but when the vehicle is to be used as a sled the wheels are removed and the members 2 and 3 serve as runners therefor.

While I have shown and described what is at present a preferred embodiment of my invention it will be obvious that it is susceptable of embodiment in structures bearing little, if any, resemblance to that illustrated and that many changes of construction and arrangement of the preferred form are capable of wide modification without departing from the spirit of the invention and the scope of the appended claims.

I claim:

1. In a vehicle of the character described, substantially horizontal frame members, substantially parallel spaced standards rising from and supported by said frame members intermediate their ends, means adapted to serve as a seat connected to said standards above said frame members and extending forwardly from the standards, and means pivotally secured adjacent the connection of the first said means to said standards for movement between a substantially vertical position to serve as a back for said seat means and a substantially horizontal position to the rear of said seat means to serve as a secondary seat.

2. In a vehicle of the character described, substantially horizontal frame members, substantially parallel spaced standards rising from and supported by said frame members intermediate their ends, means adapted to serve as a seat connected to said standards above said frame members and extending forwardly from the standards, means pivotally secured adjacent the connection of the first said means to said standards for movement between a substantially vertical position to serve as a back for said seat means and a substantially horizontal position to the rear of said seat means to serve as a secondary seat, and means for securing said pivotally secured means in either of said positions.

3. In a push sled having a pair of spaced runners, and sled steering handles interconnected and rising from said runners, a seat forward of said handles and supported by said handles at its rear end and by said runners at its front end, and a combined seat and back rest member secured to said handles and adjustably securable in a substantially horizontal position to the rear of said handles to serve as a rear seat and adjustably securable in a substantially vertical position between said handles to serve as a back rest.

4. In a push sled having a pair of spaced runners, and sled steering handles interconnected and rising from said runners, a seat forward of said handles and supported by said handles at its rear end and by said runners at its front end, a combined seat and back rest member secured to said handles and adjustably securable in a substantially horizontal position to the rear of said handles to serve as a rear seat and adjustably securable in a substantially vertical position between said handles to serve as a back rest, a brace member at one end attached to one side of said combined member at a rear portion thereof, and means for securing the other end of said brace member to one of said handles adjacent one of said runners when said combined member is used as a seat and to said forward seat when the combined member is used as a back rest.

5. In a vehicle of the character described having a pair of runners, a standard rising from each runner from corresponding places intermediate the ends thereof, and means interconnecting said standards, a member providing a substantially flat seating surface on one side and a box-like receptacle on the other side, and means for securing said member to said standards and above said runners either with said seating surface or said box-like receptacle disposed uppermost.

6. In a vehicle of the character described having a pair of runners, a standard rising from each runner from corresponding places intermediate the ends thereof, and means interconnecting said standards, a member providing a substantially flat seating surface on one side and a box-like receptacle on the other side, means for securing said member to said standards and above said runners either with said seating surface or said box-like receptacle disposed uppermost, and means whereby said member may be secured to said standards in a plurality of elevations above said runners.

In witness of the foregoing I affix my signature.

MARTIN O. CARLSON.